Figure 1:
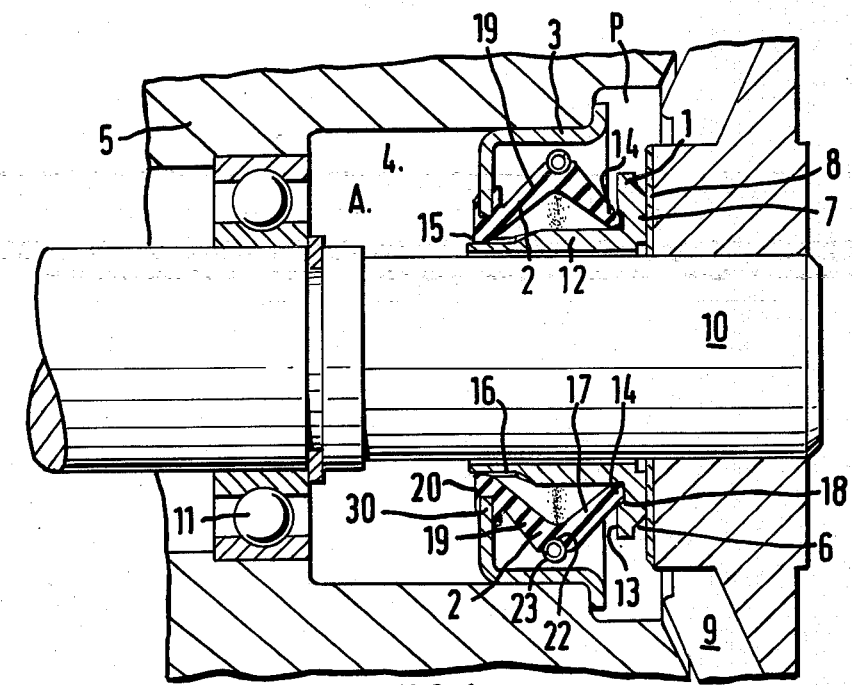

United States Patent [19]

Johnston

[11] 4,348,030
[45] Sep. 7, 1982

[54] TOGGLE-ACTION FACE SEAL FOR RELATIVELY ROTATABLE MEMBERS

[75] Inventor: David E. Johnston, Gosforth, England

[73] Assignee: George Angus & Company Limited, Newcastle upon Tyne, England

[21] Appl. No.: 260,937

[22] Filed: May 6, 1981

[30] Foreign Application Priority Data

May 12, 1980 [GB] United Kingdom ............... 8015639

[51] Int. Cl.³ ............................................ F16J 15/36
[52] U.S. Cl. ................................... 277/40; 277/42; 277/82; 277/84; 277/90
[58] Field of Search .................................. 277/38–43, 277/81 R, 82, 84, 85, 86, 93 R, 93 SD, 88–90

[56] References Cited

U.S. PATENT DOCUMENTS 2,722,439 11/1955 Brummer et al. ................. 277/42

FOREIGN PATENT DOCUMENTS

| 1082764 | 6/1954 | France ............................... 277/90 |
| 548051 | 9/1942 | United Kingdom ................. 277/90 |
| 671887 | 5/1952 | United Kingdom ................. 277/42 |
| 802386 | 10/1958 | United Kingdom ................. 277/90 |
| 912305 | 12/1962 | United Kingdom ................. 277/40 |

*Primary Examiner*—Robert S. Ward, Jr.
*Attorney, Agent, or Firm*—William R. Hinds

[57] ABSTRACT

A face seal, such as for a water pump in the cooling system of an internal combustion engine, comprises a rigid sealing ring carried by the free end of a moulded elastomeric sleeve on a mounting cup, the sleeve having at about its mid-length a circumferential flexible junction, defined by a surrounding groove with a contractile spring seated therein, and the sleeve being geometrically equivalent to an axially opposed pair of frusto-conical parts forming a toggle system which, under the pressure of sealed fluid, exerts a balancing axial bearing load on the sealing ring.

6 Claims, 7 Drawing Figures

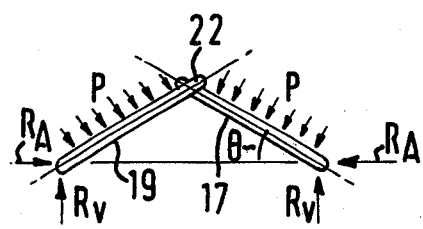
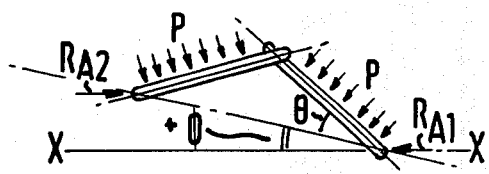
FIG.4    FIG.5
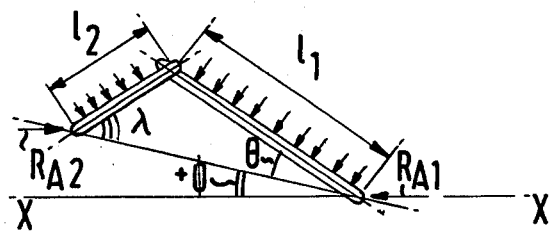
FIG.6
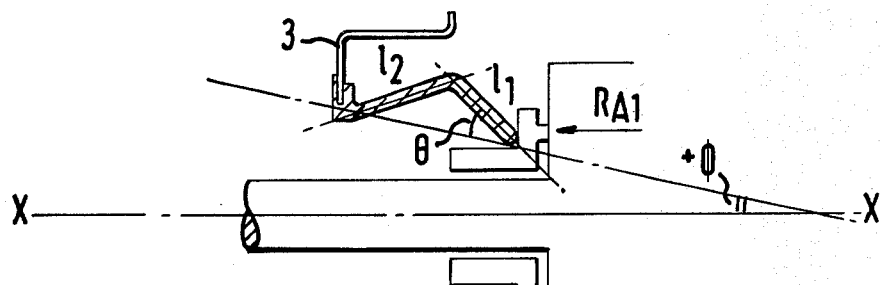
FIG.7

TOGGLE-ACTION FACE SEAL FOR RELATIVELY ROTATABLE MEMBERS

This invention relates to face seals, for opposing fluid leakage between relatively rotatable members, of the kind comprising a rigid sealing ring carried by a free end of a coaxial resiliently deformable sleeve having means at its other end for mounting the sleeve fluid-tight on one member so as to present the sealing ring to bear axially against a counterface on another, relatively rotatable, member.

It is known in such a seal, which may be referred to as "a face seal of the kind defined", to provide for the effect on the seal of the pressure of fluid to be sealed to be more or less balanced, such as by the provision of oppositely axially directed surfaces of appropriate area exposed to the fluid pressure, so as to achieve a required resultant bearing load of the sealing ring against its counterface, taking into account inherent resilient or applied spring-loading of the sealing ring.

The present invention provides a balanced face seal of the kind defined which is of simple construction, in terms of the shape and only a few parts, is particularly suitable for low fluid pressures, such as exist in the cooling water systems of internal combustion engines, and enables a fluid pressure balancing and required sealing ring loading effect to be provided for by the shape and proportions of the resiliently deformable sleeve.

The invention is applied to a face seal, of which various forms have been proposed, for example in U.K. Pat. No. 912,305, comprising a rigid sealing ring carried by a free end of a coaxial resiliently deformable sleeve, the other end of the sleeve having means for mounting the sleeve fluid tight on one member so as to present the sealing ring to bear axially against a counterface on another, relatively rotatable, member, and the unconstrained shape of the sleeve being substantially that of two axially opposed frusto-conical parts of which the smaller diameters are at the ends of the sleeve respectively and the larger diameter portions form a flexible circumferential junction at about the mid-length of the sleeve. According to the invention, there is provided around the circumferential flexible junction a circumferential groove which defines a pivotal toggle joint for the frusto-conical parts, a contractile spring is seated in the groove and the free end of the sleeve is supported on the sealing ring so as in use to conserve the frusto-conical shape of the adjacent sleeve part, the sleeve thereby forming a toggle system which, in use, is exposed to the pressure of fluid to be sealed and exerts on the sealing ring an axial bearing load dependent on the axial lengths and angles of conicity of the frusto-conical parts and the ratio of the diameters of the ends of the sleeve.

The lengths and conicity of the frusto-conical parts of the sleeve determine the leverage of the toggle system and the ratio of the diameters of the ends of the sleeve, which determines the line of operation of the toggle system, can be selected to give a desired relationship between the toggle system and the axis of the seal. By design of the sleeve to achieve equivalence with a calculated toggle system, the effect of sealed fluid pressure on the sleeve can be balanced as required to obtain a required bearing load of the sealing ring on its counterface.

The sleeve is of course designed to take account of the inherent resilience of its material in residual loading of the sealing ring, this effect also being affected by the contractile spring at the flexible junction of the sleeve. The frusto-conical shape of the free end part of the spring can be conserved simply by designing the free end to fit in the angle of a shouldered back of the sealing ring, preferably recessed to receive the end of the sleeve.

Figure 2:
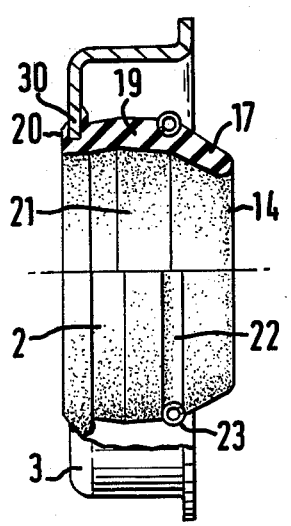
Figure 3:
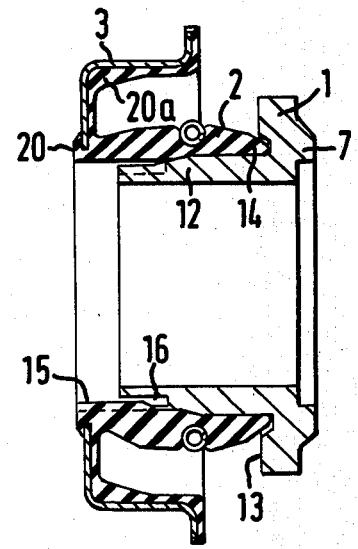

Other features of the invention are included in the following description with reference, by way of example, to the accompanying drawings, in which:

FIG. 1 is an axial section of a face seal in accordance with the invention in place in a circulating water pump of the cooling system of an internal combustion engine, FIG. 2 is a partly axially sectioned side elevation of the sleeve and mounting cup of the seal of FIG. 1, in the unconstrained state of the sleeve before the sealing ring is fitted, FIG. 3 is an axial section showing an alternative form of mounting of the sleeve and with the sealing ring fitted in the sleeve, and FIGS. 4 to 7 are explanatory diagrams of the toggle system which the seal sleeve embodies.

As shown by FIGS. 1 to 3, the face seal consists simply of a rigid sealing ring 1, for example made of carbon or a phenolic resin material as known for face seals, carried by the free end of a moulded elastomeric sleeve 2, such as of a nitrile rubber, mounted on an annular mounting cup 3, of pressed sheet metal or moulded plastics material, which fits fluid-tight into a stepped bore 4 of the body 5 of a cooling water circulating pump.

In the embodiment shown by FIGS. 1 and 2, the mounting end 20 of the sleeve 2 is moulded on to the inner peripheral rim 30 of the cup 3, or the sleeve end 20 could have a moulded groove to fit on to the cup rim 30. In the embodiment shown by FIG. 3, the mounting end 20 of the sleeve is extended into a moulded rubber lining 20a of the mounting cup 3.

The sealing ring 1 has on its front face 6 an annular land 7 which bears axially as a relatively rotatable seal fluid-tight against a plane counterface 8 on the boss of an impeller 9 carried by a rotor shaft 10 which passes with a running clearance through the sealing ring and is journalled in a bearing 11 in the pump body 5.

The sealing ring 1 has a rearward axial cylindrical spigot 12 so that the back of the ring presents a shoulder 13 into the angle of which the smaller diameter free end 14 of the sleeve 2 seats so that the ring 1 is held against rotation and the forward part 17 of the ring 1 is supported so as to conserve its frusto-conical shape in its axially loaded condition of use (FIG. 1). As an optional feature, shown only in FIGS. 1 and 3, projections 15 may be moulded on the inner surface of the sleeve 2 to engage in keyways 16 in the spigot 12 and positively oppose relative rotation of the sealing ring 1 in the sleeve 2. Alternatively, projections could be provided on the sealing ring to engage in keyway recesses in the sleeve 2.

As can be seen by comparison of FIGS. 1 and 2, the end 14 of the sleeve 2 must be stretched to pass on to the spigot 12 and consequently constantly tends to contract and thus promote a static seal in the angle of the shoulder 13 at the back of the ring 1.

As mentioned above, engagement of the end 14 of the sleeve in the angle of the shoulder at the back of the ring 1 is utilised to conserve or promote maintenance of the frusto-conical form of the forward part 17 of the sleeve 2 when the seal is in use. A special construction for this purpose is illustrated by FIGS. 1 and 3. As shown, the back of the ring 1 is undercut in the angle of the shoulder 13 to form a recess 18 around the spigot 12 to receive the end 14 of the sleeve and, when the seal is installed, support the forward part 17 of the sleeve 2 in substantially the frusto-conical shape in which it is moulded and which it resumes under axial load when the seal is installed.

The unconstrained frusto-conical shape of the part 17 of the sleeve 2 can be seen in FIG. 2 from which it can also be seen that a rearward part 19 of the sleeve is also basically of frusto-conical shape although this is to some extent masked by thickening of the rearward end 20 of the sleeve, for moulding in the mounting cup 3, and thickening of a central band 21 of the sleeve to give a designed degree of axial stiffness.

When the sleeve 2 is stretched to fit on to a sealing ring 1, it becomes somewhat straightened (FIG. 3) but it substantially recovers its original shape when installed (FIG. 1).

The flexible junction, corresponding to a toggle joint, between the frusto-conical parts 17 and 19 of the sleeve 2 is defined by a circumferential groove 22 and a contractile garter spring 23 which tends to constrict the central portion of the sleeve and augment its resilient axial load. A toroidal wire spring 23 is illustrated but another kind of contractile spring could be used, such as a split ring or rubber O-ring.

As shown in FIG. 1, the seal is installed so that the sleeve 2 is held under some axial compression between the counterface 8 of the impeller 9 and the mounting cup 3 held in the pump body bore 4.

In the installed condition shown by FIG. 1, the sealing ring 1 is thrust axially into the sleeve 2 so that the rear end of the spigot 12 enters the mounting end 20 of the sleeve 2 and both ends of the sleeve 2 are then supported by the spigot 12 against radial displacement. Consequently the sleeve 2 is left with freedom of flexible pivotal movement only of its frusto-conical parts 17 and 19.

As shown by FIG. 1, the seal assembly of the cup 3, sleeve 2 and ring 1 forms in effect a fluid-tight diaphragm dividing the bore 4 of the pump body into a pressure space P, at the impeller side through which the cooling water is circulated, and an atmospheric space A through which the shaft 10 passes to its bearing 11 and external driving means (not shown).

The pressure of water in the space P is not constant, varying with impeller speed and water temperature, and the variation of pressure must be counteracted in its effect on the sealing ring 1 and sleeve 2 so as to avoid such a variation of bearing load of the sealing land 7 on the counterface 8 as could spoil their fluid sealing tightness.

To achieve the necessary counteraction, the sleeve 2 provides a toggle system which balances the effect of fluid pressure on the axial loading of the ring 1, as explained below.

The basic principle is illustrated diagrammatically by FIG. 4 in which the two frusto-conical parts 17 and 19 of the sleeve 2 are represented by the two legs 17 and 19 of a toggle joint interpivoted at 22.

If a uniform pressure P is applied to the two legs, which in this case are of equal length, there is no axial reaction force when the angle $\theta$ is 45° and $R_A=0$. For angles of $\theta$ less than 45°, $R_A$ is positive as indicated by the arrows in FIG. 4, and vice versa.

$R_A$ thus represents the reaction on the axial loading of the sealing ring 1 resulting from fluid pressure on the sleeve 2.

For practical reasons, it is convenient to make the rearward end of the sleeve 2 of larger diameter and this is equivalent to tilting the toggle joint by an angle $\phi$ to the seal axis X—X as shown diagrammatically by FIG. 5.

With equal leg lengths, there is a range of values for the angles $\theta$ and $\phi$ for which $R_{A1}=0$ and this criterion is reached when $2\theta+\phi=90°$. If $\theta$ is less than the value calculated from this equation, then $R_{A1}$ is positive and vice versa. It should be noted that $R_{A2}$ is not always equal to $R_{A1}$.

The system can be made to have a zero reaction at one end even if the lengths $l_1$ and $l_2$ of the legs are unequal. This is illustrated by FIG. 6 in which the reaction is zero when the following equation is satisfied:

$$(l_2/l_1) \cos(\theta+\phi) = \cos[\pi-(\theta+\lambda)-(\theta+\phi)]$$

For values of $(\theta+\lambda)$ less than those calculated from this equation the reaction force $R_{A1}$ is positive, and vice versa.

It can be shown that different proportions of pressure balancing can be achieved by appropriate selection of the toggle angles and leg lengths.

FIG. 7 illustrates the equivalence of a seal sleeve, in accordance with the present invention, to a toggle system. For simplicity, equal leg lengths of the toggle system are shown.

It will of course be appreciated that allowance must be made for the circular cross-sectional shape of the sleeve 2 so that, even though the leg lengths are equal, the total area of each leg of the sleeve is different because their mean radii are different. This results in the balance condition being slightly different from the simple two-dimensional case but in practice the simple analysis is adequate.

In addition to the effect of fluid pressure on the sleeve 2, allowance must be made for the effect on the axially-directed faces of the sealing ring 1, respectively the margin of the front face 6 around the land 7 and the face of the shoulder 13 around the end 14 of the sleeve. The differential area of these faces, the inherent resilience of the sleeve under installed axial compression and the contractile load of the spring 23 are all factors in the total balance of the seal.

I claim:

1. A face seal comprising a rigid sealing ring carried by a free end of a coaxial resiliently deformable sleeve, the other end of the sleeve having means for mounting the sleeve fluid-tight on one member so as in use to present the sealing ring to bear axially against a counterface on another, relatively rotatable, member, the unconstrained shape of the sleeve being substantially that of two axially opposed frusto-conical parts of which the smaller diameters are at the ends of the sleeve respectively and the larger diameter portions form a flexible circumferential junction at about the mid-length of the sleeve, there being provided around the circumferential flexible junction of the sleeve a circumferential groove which defines a pivotal toggle joint for the frusto-conical parts of the sleeve, a contractile spring seated in said groove and the free end of the sleeve being supported on the sealing ring by means shaped to conserve in use the frusto-conical shape of the adjacent sleeve part, the sleeve thereby forming a toggle system which, in use, is exposed to the pressure of fluid to be sealed and exerts on the sealing ring an axial bearing load dependent on the axial lengths and angles of conicity of the frusto-conical parts of the sleeve and on the ratio of the diameters of the ends of the sleeve.

2. A face seal according to claim 1, in which the free end of the sleeve is shaped to be stretched to pass on to and fit in an angle of a shoulder at the back of the sealing ring forming said supporting means to conserve the frusto-conical shape of the adjacent sleeve part.

3. A face seal according to claim 2, in which a recess is provided in the angle of the shoulder at the back of the sealing ring, said recess receiving the free end of the sleeve and supporting the adjacent part of the sleeve in frusto-conical shape when the seal is installed.

4. A face seal according to claim 1, in which the back of the sealing ring has an axial cylindrical spigot which, when the seal is installed, supports the ends of the sleeve against radial displacement.

5. A face seal according to claim 4, in which the sleeve and sealing ring spigot have interengaged projections and keyways positively to oppose relative rotation of the sealing ring in the sleeve.

6. A face seal according to claim 1, in which the mounting means comprises an annular mounting cup with an inner peripheral rim of which the respective end of the sleeve is engaged.

* * * * *